United States Patent [19]

Brenner et al.

[11] 4,193,899

[45] Mar. 18, 1980

[54] ELASTOMERIC SYSTEMS HAVING UNUSUAL MEMORY CHARACTERISTICS

[75] Inventors: Douglas Brenner, Livingston; Robert D. Lundberg, Bridgewater, both of N.J.

[73] Assignee: Exxon Research & Engineering Co., Florham Park, N.J.

[21] Appl. No.: 855,567

[22] Filed: Nov. 29, 1977

[51] Int. Cl.$^2$ ............................................. C08L 91/00
[52] U.S. Cl. .......................... 260/23.5 A; 260/23.7 M; 260/32.6 A; 264/230
[58] Field of Search ............................. 264/230, 294; 260/23.7 M, 79.3 R, 32.6 A, 23.5 A

[56] References Cited

U.S. PATENT DOCUMENTS

| | | | |
|---|---|---|---|
| 3,642,728 | 2/1972 | Canter | 260/79.3 R |
| 3,842,154 | 10/1974 | Lundberg et al. | 264/294 |
| 3,847,854 | 11/1974 | Canter et al. | 260/23.7 M |
| 3,939,242 | 2/1976 | Lundberg et al. | 264/294 |
| 4,053,548 | 10/1977 | Lundberg et al. | 264/294 |

Primary Examiner—Jeffery R. Thurlow
Attorney, Agent, or Firm—Richard E. Nanfeldt

[57] ABSTRACT

This invention involves a process for the utilization of an unusual memory characteristic which is present in neutralized sulfonated elastomeric materials, wherein the process includes the steps of distorting or compressing the neutralized sulfonated elastomeric article, then heating the article to a selected elevated temperature, holding the article at the elevated temperature for a limited time while maintaining the distorted shape, cooling the article to near room temperature, and releasing it from the device used to compress or distort it. The released cooled elastomer does not return to its original form, but rather substantially retains the distorted shape for an indefinite period of time. The elastomer in the distorted shape is heated to an appropriate elevated temperature thereby allowing the article to recover towards its original undistorted shape.

16 Claims, No Drawings

ELASTOMERIC SYSTEMS HAVING UNUSUAL MEMORY CHARACTERISTICS

BACKGROUND OF THE INVENTION

1. Field of the Invention

This invention involves a process for the utilization of an unusual memory characteristic which is present in neutralized sulfonated elastomeric materials, wherein the process includes the steps of distorting or compressing the neutralized sulfonated elastomeric article, then heating the article to a selected elevated temperature, holding the article at the elevated temperature for a limited time while maintaining the distorted shape, cooling the article to near room temperature, and releasing it from the device used to compress or distort it. The released cooled elastomer does not return to its original form, but rather substantially retains the distorted shape for an indefinite period of time. The elastomer in the distorted shape is heated to an appropriate elevated temperature thereby allowing the article to recover towards its original undistorted shape.

2. Description of the Prior Art

The present unique and novel invention relates to a fabrication process for reforming a neutralized sulfonated elastomer by utilization of an unusual memory property of these elastomers. This fabrication process permits production of a metastable state of these elastomeric articles which on simple heating undergoes a hystersis to approximately their original shape. Thus, for example, by this process an elastomeric article can be compressed and maintained in a metastable distorted shape for compact storage or transport; and then subsequently, it can be heated to an elevated temperature to cause it to recover towards its original shape.

The memory characteristic with which this invention is concerned has been described previously for thermoplastic polymer systems, but not for elastomeric polymers due to their extremely low glass transitions. More specifically, this characteristic has typically been limited to polymers which possess a glass transition or crystalline melting point well above room temperature, and which also are chemically covalently crosslinked to provide the permanent restoring forces. For example, chemically crosslinked polyethylene is well known in the art. This polymer can be molded above the crystalline melting point of the polyethylene, and then chemically crosslinked in the molded form (usually by irradiation) to result in permanent covalent crosslinks. Thus, if subsequently heated even much above the crystalline melting point, the polymer will not flow; and, even if deformed, the polymer will attempt to return to its equilibrium state which is that molded shape in which it was chemically covalently crosslinked. If heated to above the crystalline melting point and stressed to a different configuration, and then cooled in this configuration to below the melting point of the polyethylene, the polymer will retain indefinitely the deformed configuration at ambient temperature. If, however, the polymer is heated again above the melting point of the polyethylene crystallinity, the polymer will respond to the previously locked-in stresses and achieve the configuration which it held during the chemical crosslinking procedure. As noted above, this behavior for plastics is based on two critical features: the polymer must possess a glass transition or crystalline melting point above room temperature, and it must be chemically covalently crosslinked to provide the permanent restoring forces. This latter requirement has the result that the plastic becomes thermoset. That is, it is no longer melt processable or melt reprocessable.

U.S. Pat. No. 4,053,548 describes a new process for exhibiting a memory effect in plastic materials which is based on selected multiphase plastic block copolymers, and also by plastics possessing ionic domains. These latter systems possess the added advantage of processability which is a very important attribute heretofore not readily available with such memory conferring systems.

However, these systems are also plastic in nature (i.e. a high stiffness modulus at room temperature in excess of about 10,000 psi). And, as with the other systems exhibiting the memory characteristic, these systems also depend on the existence of glass transitions of crystalline melting points above room temperature, and they are not rubbery at normal use temperatures as are the sulfonated elastomeric polymers of the present invention.

The sulfonated elastomeric compositions of the present invention are derived from elastomeric polymers having a hydrocarbon backbone with olefinic unsaturation, especially elastomeric polymers such as Butyl and EPDM rubbers. The process of sulfonating polymers is described in U.S. Pat. Nos. 3,642,728 and 3,836,511, herein incorporated by reference, and U.S. Pat. Nos. 3,870,841 and 3,847,854 herein incorporated by reference, which teach methods of plasticization of these sulfonated polymers. U.S. Pat. Nos. 3,867,319 and 3,947,387 by Lundberg, herein incorporated by reference, teach a process for the formation of an expanded foam of a sulfonated thermoplastic. However, these patents fail to describe or ascertain the ability of sulfonated elastomeric articles to exhibit the novel memory effect for elastomers with which this present invention is concerned. It is surprising that a sulfonated elastomeric article which has its glass transition substantially below room temperature can exhibit a memory effect similar to that of plastic materials. Accordingly, the present instant invention provides a unique and novel process for forming a metastable state of a sulfonated elastomer which contains locked-in stresses, and which is later recovered towards its original shape by heating.

SUMMARY OF THE INVENTION

The present invention relates to a unique and novel process for fabricating a sulfonated elastomeric article into a distorted or compressed state, whereupon the application of heat at a later time causes recovery of the distorted article towards its previous original shape.

Accordingly, it is an object of our present instant invention to provide a unique and novel process for utilizing this memory characteristic with an elastomeric sulfonated polymer. The process consists of the fabrication of the sulfonated elastomeric article into a distorted or compressed state, and the subsequent reforming of the article towards its original state upon the application of heat.

GENERAL DESCRIPTION OF THE INVENTION

The present instant invention relates to a novel process for fabricating a sulfonated elastomeric article into a distorted or compressed state; substantially retaining this shape at ambient temperature for an indefinite period of time; and then, when desired, the simple application of heat recovers the article towards its previous shape.

The neutralized sulfonated elastomeric polymers of this present instant invention include polymers derived from unsaturated polymers which include low unsaturated elastomeric polymers such as Butyl rubber, or EPDM terpolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+8, 212° F.) of about 40-50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Patent No. 1,030,289 and French Patent No. 1,386,600, which are incorporated herein by reference. The preferred polymers contain about 40 to about 80 wt. % ethylene and about 1 to about 10 wt. % of a diene monomer, the balance of the polymer being propylene. More preferably, the polymer contains about 45 to about 75 wt. % ethylene, e.g. 50 wt. % and about 2.6 to about 8.0 wt. % diene monomer, e.g., 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The Mn of Vistalon 2504 is about 47,000, the Mv is about 145,000 and the Mw is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The Mn of Vistalon 2504-20 is about 26,000, the Mv is about 90,000 and the Mw is about 125,000.

Nordel 1320 (DuPont) is another terpolymer having a Mooney viscosity at 212° F. of about 25 and having about 53 wt. % of ethylene, about 3.5 wt. % of 1,4-hexadiene and about 43.5 wt. % of propylene.

The EPDM terpolymers of this invention have a number average molecular weight (Mn) of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, and most preferably about 15 to about 40. The Mv of the EPDM terpolymer is preferably below about 350,000 and more preferably below about 300,000. The Mw of the EPDM terpolymer is preferably below about 500,000 and more preferably below about 350,000.

One means for carrying out the reaction of polymer sulfonation is to dissolve the elastomeric polymer in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and nonreactive solvent at a temperature of about $-10°$ C. to about 100° C. for a period of time of about 1 to about 60 minutes, more preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophenol, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cycloaliphatic alcohol such as a cyclohexanol or with water. The acid form of the sulfonated elastomeric polymer has about 10 to about 60 meq. $SO_3H$ groups per 100 grams of sulfonated polymer, more preferably about 15 to about 50; and most preferably about 20 to about 40. The meq of $SO_3H/100$ grams of polymer is determined by both titration of the polymeric sulfonic acid and Dietert Sulfur analysis. In the titration of the sulfonic acid the polymer is dissolved in a solvent consisting of 95 parts of toluene and 5 parts of methanol at a concentration level of 50 grams per liter of solvent. The acid form is titrated with ethanolic sodium hydroxide to an Alizarin Thymolphthalein endpoint.

Neutralization of the acid form of the sulfonated elastomeric polymer is done, for example, by the addition of a solution of neutralizing agent such as a metal acetate or ammonium bases such as ammonium acetate or amines to the acid form of the sulfonated elastomeric polymer which is dissolved in the mixture of the aliphatic alcohol and non-reactive solvent. The metal acetate is dissolved in a binary solvent system consisting of water and/or an aliphatic alcohol. Typically, but non-limiting metal acetates are sodium acetate, ammonium acetate, barium acetate, magnesium acetate, aluminum acetate, potassium acetate, lead acetate, and zinc acetate, wherein zinc acetate is preferred. Typical amines are the simpler lower molecular weight amines such as methylamine, ethylamine, butylamine, dimethylamine, trimethylamine, cyclohexylamine, piperidine and aniline.

Sufficient neutralizing agent is added to the solution of the acid form of the elastomeric polymer to effect neutralization of the $SO_3H$ groups. It is preferable to neutralize at least 95% of the acid groups, more preferably about 98%, most preferably 100%. Metal oxides and hydroxides such as ZnO and $Mg(OH)_2$ can also be employed to effect the neutralization of the $SO_3H$ groups.

The resultant neutralized sulfonated terpolymer has a melt viscosity which is dependent upon the molecular weight of the base polymer, the level of sulfonation, and the associated cation. An EPDM with an original Mooney viscosity (ML, 1+8, 212° F.) of about 55, containing about 40 meq. sulfonate/100 g EPDM and possessing cations such as mercury, magnesium, calcium, cobalt, lithium, barium, sodium and the like may crumble upon exiting from a capillary rheometer at 200° C. at a shear rate of 0.73 sec.$^{-1}$ and will possess an apparent viscosity in excess of $5\times10^6$ poise. An EPDM with an original Mooney viscosity (ML, 1+8, 212° F.) of about 20, containing about 30 meq. sulfonate/100 g EPDM, and possessing cations such as zinc, lead, and ammonium possess apparent viscosities of from about $10^6$ to about $10^7$ *poise at a shear rate of* 0.73 sec$^{-1}$ at 200° C. Lower sulfonate contents with amine salts result in apparent viscosities below $1\times10^6$ poise under the same testing conditions.

On the other hand the physical properties of the unplasticized sulfonated and neutralized elastomers improve with increasing sulfonate content. Further, metallic cations provide better physical properties than the ammonium or amine cations. Good development of physical properties usually starts to occur when about 20 meq. sulfonate/100 g polymer are present, and the physical properties obtained at 30 meq. sulfonate/100 g polymer and higher are preferred. However, even at these higher levels of sulfonate and unplasticized neutralized sulfonated elastomers still possess relatively modest physical properties, and the melt viscosities are so high that mixing or processing these gums in the absence of a plasticizer on conventional equipment is extremely difficult if not impossible.

U.S. Pat. No. 3,847,854 addressed itself to the problem of melt processability in metal sulfonate containing elastomers and a large number of materials are claimed as plasticizers that would give the ionomers lower melt viscosities at processing temperatures and thereby permit melt fabrication.

The compositions with which the memory effect process of the present invention are concerned are formed from a mixture of a neutralized sulfonated elastomeric polymer, a preferential polar plasticizer and preferably extenders and fillers which are known in the art of rubber compounding, such as process oils, and mineral fillers or carbon black. The composition can be of bulk density or foamed such as is described in copending U.S. Ser. No. 855,727, filed the same day as the instant application and herein incorporated by reference.

A preferential polar plasticizer is used to help weaken the ionic associations of the neutralized sulfonate groups to enable rapid and effective fabrication of the sulfonated polymer. This is necessitated by the fact that for most neutralized sulfonated elastomeric polymers, quite high temperatures are required to obtain appreciable flow rates; and for some sulfonated polymer systems this temperature is above the thermal decomposition temperature of the polymer. The preferential polar plasticizer through the weakening of the ionic associations decreases the melt viscosity of the neutralized sulfonated elastomeric polymer at elevated temperatures thereby making it readily processable.

There are two major groupings of preferential polar plasticizers which are designated as volatile and nonvolatile plasticizers. The major practical difference between the two types is that the nonvolatile plasticizers remain with the final product while the volatile plasticizers are for the most part volatilized from the ionomer once they have performed their function of improving the rheology of the sulfonated polymer during the fabrication process. For the memory effect process of the instant invention the preferential polar plasticizer should preferably be nonvolatile for several reasons. A limited degree of (partially reversible) flow is required for the formation of the metastable distorted shape in the memory effect process of this invention, and this residual flow is best provided for by the presence of the nonvolatile plasticizer. A difficulty in the use of volatile polar plasticizers is satisfactory removal of the volatile plasticizer during the fabrication of the article which is to undergo the memory effect process. This removal of the volatile polar plasticizer is a difficult procedure to control and it can be time consuming as well as resulting in articles with surface blemishes and other imperfections. Often the use of volatile polar plasticizers in the fabrication of a sulfonated elastomeric article results in residual volatile plasticizer being left in the sulfonated polymer. Since some of this residual polar plasticizer will be driven off during the heating stages of the memory effect process, the use of volatile polar plasticizer is expected to be detrimental both to the degree of recovery of the article from its metastable distorted shape, and to control and reproducibility of the process. Therefore, nonvolatile polar plasticizers are preferred in the practice of this invention.

By the proper selection of the preferential plasticizer it is possible to obtain good physical properties in the plasticized, neutralized, sulfonated elastomeric polymer. A preferred class of preferential plasticizers are metallic salts of long chain aliphatic acids wherein the long chain aliphatic acid has about $C_{12}$ to about $C_{40}$ carbons, preferably about $C_{14}$ to about $C_{26}$, most preferably about $C_{16}$ to $C_{22}$ carbon atoms, wherein the metallic cation is selected from the group consisting of antimony, lead or Groups IA, IIA, IB or IIB of the Periodic Table of Elements and mixtures thereof. Because with metal salts the cation might partially exchange with the cation of the neutralized sulfonated polymer, it is preferable (but not necessary) that the metal salt contain the same cation as the sulfonated polymer. A preferred plasticizer is zinc stearate, preferably in combination with a zinc neutralized sulfonated polymer. A less preferred class of preferential plasticizers are the aforementioned fatty acids alone or in combination with the aforementioned metallic salts of the fatty acids. Other preferential plasticizers which are preferred in the instant compositions include amids, ureas, amines or thioureas, (some of which are described in copending U.S. Pat. Nos. 4,131,587; 4,118,362; and 4,118,359, filed the same day as the instant application and herein incorporated by reference) and mixtures thereof. The preferential plasticizers are incorporated into the compositions at about 0 to about 60 parts by weight per hundred parts of the metal neutralized sulfonated elastomeric polymer, more preferably at about 2 to about 40, and most preferably about 8 to about 30.

Various additives can be compounded with the plasticized, neutralized sulfonated elastomeric polymers, wherein the physical and rheological properties are modified due to the incorporation of these additives. The additives include fillers, pigments, lubricants, and polyolefinic thermoplastics, process oils and mixtures thereof. These additives can be incorporated in the blend compositions by techniques well known in the art.

Fillers which can be employed in the present invention include carbon black, alumino-silicates, talcs, calcium silicate, ground calcium carbonate, water precipitated calcium carbonate, or delaminated, calcined or hydrated clays and mixtures thereof. The carbon blacks can be selected from the group consisting essentially of furnace, channel, metallic, lamp, or acetylinic blacks. These fillers are normally incorporated into the composition at about 0 to about 250 parts by weight based on 100 parts of the sulfonated polymer; more preferably at about 0 to about 200; and most preferably at about 10 to about 150. Typically, these fillers have a particle size of about 0.03 to about 15 microns, more preferably about 0.05 to about 10. The oil absorption as measured by grams of oil absorbed by 100 grams of filler is usually about 10 to about 100, more preferably about 10 to about 85 and most preferably about 10 to about 75. Typical fillers employed in this invention are illustrated in Table I.

ASTM-D-2226-70, aromatics ASTM Type 102 or naphthenics ASTM Type 104A wherein the oil has a flash point by the Cleveland open cup of at least 350° F., a pour point of less than 40° F., a viscosity of about 70 to about 3000 S.S.U.'s and a number average molecular weight of about 300 to about 1000, more preferably about 400 to about 750. The preferred process oils are paraffinics. Typical oils are summarized in Table II.

The oils are normally incorporated into the blend composition at a concentration level of about 0 to about 150 parts by weight based on 100 parts of the sulfonated polymer, more preferably at about 5 to about 125, and most preferably at about 10 to about 100.

TABLE II

| Type Oil | Oil Code # | Viscosity SSU | $\overline{M}n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other chemical additives can be incorporated into the blend compositions to improve the physical properties, the appearance, the chemical properties of the elastomeric article or to modify the processability of the compositions.

A crystalline polyolefinic thermoplastic can be incorporated into the blend composition in minor proportions as a means for modification of the rheological properties of the compositions as well as the rigidity of the fabricated article. Typically, the crystalline polyolefinic thermoplastic is added to the composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the

TABLE I

| Filler | Code# | Oil Absorption grams of oil/ 100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | 50–55 | 2.6 | 2 | 4.0 |
| Calcined clay | Icecap IL | 60–70 | 2.63 | 1 | 5.0–6.0 |
| Talc magnesium silicate | Mistron Vapor | | 2.75 | 2 | 9.0–7.5 |

The oils employed in the present invention are preferably nonpolar backbone process oils having less than about 2 wt. % polar type compounds as measured by molecular type clay gel analysis. These oils can be selected from paraffinics ASTM Type 104B as defined in group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment. The zinc oxide is incorporated into the blend composition at a concentration level of about 0 to about 50 parts by weight based on 100 parts of sulfonated polymer, more preferably about 0 to about 25.

Alternatively a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 50 parts by weight per hundred parts of the neutralized sulfonated elastomeric polymer, wherein the metal ion of the metallic hydroxide is selected from Group IIA of the Periodic Table of Elements such as barium, calcium or magnesium.

A lubricant can be employed into the composition at a concentration level of about 0 to about 50 parts by weight based on 100 parts of the neutralized sulfonated elastomeric polymers and more preferably about 6 to about 25. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the compositions, thereby improving the processability in forming the elastomeric article.

The articles utilized in the memory effect process of the present invention are fabricated from sulfonated, neutralized elastomeric compositions. Any of the fabrication means known in the art are satisfactory such as, for example, compression molding, extrusion, and injection molding. In the case of foamed articles, some techniques for foaming sulfonated neutralized elastomers are described in copending U.S. Ser. No. 855,727 which was filed the same day as the instant application and previously incorporated herein by reference. The techniques for foaming include the utilization of physical and chemical blowing agents (preferably chemical blowing agents), and the use of extrusion, compression molding, and injection molding foaming procedures.

Having set forth the compositions with which the process of the present invention is concerned, and having described some methods of preparation of the sulfonated elastomeric polymers, and techniques for fabricating articles from them, the novel memory effect process of the present invention may be practiced according to the following process which is similar for both bulk density compositions and foamed compositions, although the applications of the process may differ somewhat for these two classes of material.

The process is practiced on a fabricated article composed of a sulfonated, neutralized elastomer preferably containing a nonvolatile polar plasticizer, and preferably also containing extenders and fillers. The article is first held in a selected distorted or compressed shape; for example, by compression in a clamping device. The distorted article is then heated to an intermediate temperature and held at that temperature so as to lock in or partially lock in the distorted shape. The intermediate temperature used is preferably well above room temperature, but below the temperatures normally used in rapid fabrication techniques for the material. For example, preferred temperatures are about 50° C. to about 160° C., more preferred temperatures are about 60° C. to about 150° C., and most preferably at temperatures of about 70° C. to about 140° C. The temperature employed will depend somewhat on the length of time that the article is held at this intermediate temperature. The use of shorter holding times will tend to favor the use of higher temperatures to lock in the distortion to a greater degree. However, use of too high of a temperature or too long of a holding time at a high temperature may result in much of the distortion being unrecoverable later in the process. Times for holding the elastomeric article in the distorted or compressed shape at the intermediate temperature can be from about a few minutes at the higher end of the preferred temperature range to hours or days at the lower end. Preferably the article is held at the intermediate temperature for from about 1 minute to about 2 days, more preferably from about 2 minutes to about 24 hours, and most preferably from about 5 minutes to about 2 hours.

After the heat treatment at the intermediate temperature the article is cooled to about room temperature (or the temperature at which it will be stored). Preferably, during this cooling procedure the article is still held in the distorted shape so as to avoid any partial recovery of the distorted article during this stage of the process. After the article is at or about room temperature, it is released from the holding or clamping device, and it is found to retain all or part of the imposed distortion. This resultant distorted or compressed shape of the elastomeric article, after it is released from the clamping device, represents a metastable state for the article in which it retains a memory of the original shape in the form of residual locked in stresses. While stored at ambient temperature, this distorted shape is substantially maintained, though, there may be a tendency towards slow recovery of the original shape if the article in the metastable state is stored for prolonged periods of time.

When it is desired to utilize the memory effect and recover an article which is being stored in its metastable state, the article is heated to an intermediate temperature. It has been found that the temperature utilized for recovery of the article towards its original shape can usually (but not necessarily) be somewhat greater than the temperature at which the distortion was locked in; and in some cases the length of time for recovery can be shorter. Preferably the temperature for recovery is about 60° C. to about 180° C., more preferably about 70° C. to about 160° C., and most preferably about 85° C. to about 150° C. However, in special applications where heating is inconvenient or impractical, it is possible to get partial recovery of the article by allowing it to remain for a prolonged time at a temperature below about 60° C.

The time for the recovery at the intermediate temperature can be from a few minutes at the higher end of the preferred temperature range to hours or days at the lower end. Preferably, for this recovery stage of the process the article is held at the intermediate temperature for from about 2 minutes to about 2 days, more preferably from about 4 minutes to about 24 hours, and most preferably from about 10 minutes to about 1 hour. The degree to which the distorted article recovers towards its original shape is a complex function of many factors, such as the composition of the neutralized sulfonated elastomer including counterion, sulfonate level, and polymer backbone, as well as the type and concentration of polar plasticizer, and type and concentration of extender and fillers. Other factors which will affect recovery in this memory effect process are whether the article is of bulk density or foamed, the amount and type of distortion or compression utilized, and the times and temperatures of the various stages of this process. Various applications will require different degrees of recovery in order for this elastomeric memory effect process to be useful.

It should be apparent that the compositions of the instant invention possess the capability of storing elastic energy at ambient temperatures for extended periods of time. The reasons for this unusual behavior are still somewhat speculative, but it is believed that the ionic associations of the sulfonated elastomer play an important role in this process. Thus, when a fabricated article is compressed or otherwise distorted at a temperature above room temperature and below the fabrication temperature, it is believed that substantial residual ionic interactions from the original shape still remain. Thus, while distortion of this heated article results in the formation of a considerable degree of new ionic interactions which help to maintain the distorted shape, there still exists a substantial elastic strain resulting from the residual ionic interactions. These residual interactions can now be locked in the article by lowering the temperature. The lowered temperature increases the strength of ionic interaction and thereby provides a more permanent crosslink. Subsequent reheating of the distorted article to a temperature near that at which it was distorted thus permits the restoring forces to recreate the approximate shape of the original fabricated article.

Thus, the uniqueness of this phenomenon is seen to arise from the nature of the ionic interactions which provide the characteristic ionic interaction-temperature profile. The presence of the polar preferential plasticizer provides additional control over the temperature profile of these systems. It is believed, based on this hypothesis that conventional polymers, not possessing the ionic groups herein described, will not display the elastic memory effects herein described.

There are numerous applications for the memory effect process of the present invention. The types of applications can be roughly subdivided according to whether the sulfonated elastomeric article is of bulk density or is foamed. For bulk density sulfonated elastomers the memory effect process is useful for installation of rubber parts so as to form secure press-fits on a device, or to simplify installation in difficult positions. In either case, the rubber part is formed into a selected distorted metastable state according to the process described above, and it is installed in this shape. After installation the article is heated so as to cause it to recover to the desired, predetermined shape. Since an article in the metastable state often does not recover completely to the original shape during the heating stage, it is necessary to check the degree of recovery which will be exhibited by a particular article, and to use this information in the development of appropriate procedures. An example of the use of a bulk sulfonated elastomer article in the memory effect process is for securing a rubber bumper pad in a metal holder. By appropriately compressing the sulfonated rubber pad and forming a metastable distorted state by the process of this invention, the pad can be easily inserted into the metal holder, and by simple heating the rubber pad expands so as to be firmly secure in the metal holder.

Another application of the memory effect process for a bulk elastomer is for transport or storage of shaped rubber articles, wherein the article is formed into a flatter or more compact metastable state during storage. When the article is needed, it is heated to recover towards its original shape. Note, though, that recovery is often not complete, so the article must be designed to compensate for the particular degree of recovery. Other applications and detailed examples of the memory effect process for bulk density sulfonated elastomeric articles are given in Examples 2, 3 and 4 of this application.

The memory effect process of the present invention is useful for foamed sulfonated elastomers in some of the applications described above for bulk density articles. However, there are additional applications of this process for the foamed sulfonated elastomers because of the softness possible with the foams, because of the capability of making large volume changes in the foams, and because foams are cheaper per unit volume and are generally good insulators for both heat and noise. For example, the softness of low density sulfonated elastomeric foams lends itself to packaging applications for delicate objects. The delicate object is loosely surrounded with partially compressed elastomeric foam in its metastable distorted state, and then the foam is heated to form a snug, and secure, but gentle support for the object which will diminish sliding and bumping of the object during transport.

Another important application for the sulfonated elastomeric foams using the memory effect is in void filling. The void can be loosely filled with compressed foam in the metastable state. Then upon heating the foam will recover to firmly fill the void. Such void filling is useful both as a sound deadener, or as thermal insulation. As a specific example, void spaces in the door of a car could be filled with the compressed foam, and then subsequently expanded in painting ovens or some other heating chamber. Further applications of the memory effect process with sulfonated elastomeric foams, and detailed examples are given in Examples 5 and 6 of this application.

DETAILED DESCRIPTION

The advantages of both the process and the compositions of the present invention can be more readily appreciated by reference to the following examples.

EXAMPLE 1

Preparation of a Lightly Sulfonated EPDM Gum Material

The EPDM elastomeric polymer used as the backbone polymer for making the sulfonated product had a composition of about 52 wt. % ethylene, 43 wt. % propylene and 5 wt. % of 5-ethylidene-2-norbornene, and it had a Mooney viscosity ML @100° C. (1+8 min.) of about 40. This base polymer was lightly sulfonated using acetyl sulfate in accordance with the method disclosed in U.S. Pat. No. 3,836,511 to a sulfonate level of about 0.75 mole percent (based on the "mer" groups of the polymer) of sulfonic acid groups attached to the EPDM polymer backbone. This free acid form of the sulfonated polymer was utilized to prepare some of the neutralized sulfonated EPDM samples used in the following examples.

EXAMPLE 2

Memory Behavior of a Bulk Density Sulfonated EPDM Polymer

The acid form of the sulfonated EPDM polymer described in Example 1 was neutralized with an excess of magnesium oxide, equal to 5 wt. %, to insure complete neutralization of the free acid form of the polymer. To the neutralized polymer was added stearic acid at a concentration of 5 phr (parts by weight per hundred parts of neutralized sulfonated EPDM gum). The stearic acid acts as a polar plasticizer for the neutralized polymer to enable adequate processability at the temperature of fabrication. To the plasticized polymer was added 100 phr of Flexon 845 processing oil (Exxon Chemical Co.), 75 phr of an FEF type carbon black, and 75 phr of an SRF type carbon black; and the compound was melt mixed to give a homogeneous material. A pad was then fabricated from this compound at roughly 350° F.

A sample from the pad of compounded, sulfonated EPDM was compressed 25% in a clamping device, and it was held under this compression for about a day at a temperature of 70° C. After this time the sample was removed from compression, but it retained a deformation in its height of 19%. The sample remained at room temperature overnight without having an appreciable change in its height. Then the sample was exposed to a temperature of 85° C. for 6½ hours. After this heating, the initial deformation had decreased by 47%. After another 3 days at 85° C., 80% of the initial deformation had been recovered.

This example illustrates the memory characteristic for this bulk density, compounded sulfonated EPDM material. That is, this material was compressed and held at an elevated temperature, and when released from compression it retained a distorted shape. This distorted shape was substantially retained while the sample remained at room temperature. However, when the distorted sample was heated to an elevated temperture, it recovered substantially towards its original shape because of the "locked in memory" of the sample. This memory behavior has application for transportation and storage of shaped rubber articles. These articles constructed of sulfonated EPDM can be partially flattened for better compactness prior to transport or storage by compressing at elevated temperture. Then, when the article is needed for use, it can be heated to substantially restore its shape. Note, however, that recovery is often not complete, so the degree of recovery required in potential applications must be considered.

The memory characteristic can also be utilized to assist installation of rubber parts in tight or awkward positions, or alternatively to achieve a secure "press-fit" for a rubber object. The rubber article made of sulfonated EPDM can be distorted at elevated temperature by the procedure described above so that it will easily fit in place. Once the article is installed, it can be heated so that its memory will cause it to conform to the predetermined shape. Still another application of the memory characteristics of these sulfonated elastomers is for the elimination of noise from loose parts which are subject to vibrations. The movement of the loose part is eliminated by placing a wedge of the compressed rubber in the metastable state between the loose part and a nearby structural part. Heating the compressed sulfonated EPDM rubber then expands it and results in a particularly tight, secure holding of the rubber against the formerly loose part.

EXAMPLE 3

Reutilization of the Memory Effect in a Bulk Density Sulfonated EPDM Polymer Composition The sample which was used in Example 2 was recompressed by about 25% of its height, and it was held under compression for about a day at 70° C. After this time the sample was removed from compression, but it retained a deformation in its height of 13%. The sample was left at about 60° C. in air for about 30 minutes and then remained overnight at about room temperture. In the morning the deformation was remeasured and it was found to have had little change. The sample was then placed in an air oven for one hour at 110° C. A measurement of the height of the sample then showed that it had recovered about 97% of the initial deformation. After another 3 hours at 110° C. the sample had recovered over 98% of the initial deformation.

This example illustrates that the same sample can be reused and will still exhibit a memory characteristic. In fact, when reused in a manner similar to its previous use, it appears that the recovery (or memory) of the sample improves. Apparently this is because some of the irreversible distortion which occurs in the first usage remains constant in the material, so that further irreversible changes are less likely to occur.

EXAMPLE 4

The Memory Effect in a Sulfonated EPDM Having 0.9 Mole Percent Sulfonation

This sample was prepared from a free acid sulfonated EPDM similar to that described in Example 1, except that the sulfonation level was made higher, at 0.9 mole percent. This material was neutralized with 14 wt. % of magnesium stearate which resulted in production of stearic acid as well as excess magnesium stearate. The stearic acid and excess magnesium stearate functioned as polar plasticizers for the material, enabling easy fabrication at process temperatures. To this plasticized neutralized sulfonated EPDM gum was added 100 phr (parts by weight per hundred parts of gum) of Flexon 845 processing oil, 75 phr of FEF type carbon black, and 75 phr of SRF type carbon black. These ingredients were mixed and homogenized as a melt at elevated temperature; and a pad was fabricated from this compound at roughly 350° F.

A sample from the pad of compounded, sulfonated EPDM was placed in a clamp and compressed by 25% of its height. It remained compressed at 70° C. for about a day. When removed from compressing, the sample was observed to have retained the full 25% deformation. This sample remained at room temperature for over a month without any significant recovery from the deformation. Then the sample was heated for one-half hour at approximately 130° C. At the end of this time the sample had risen so as to recover 20% of the deformation. After being held at 105° C. overnight a total of 26% of the deformation had been recovered.

This example illustrates the memory characteristic in a different formulation of a sulfonated EPDM. The degree of sulfonation is different from Example 2, as are also the neutralization agent and the polar plasticizer components. By comparing the memory effect exhibited by this sulfonated EPDM material with the material of Example 2, it is seen that the degree of recovery exhibited in the memory effect will depend on the particular formulation. In some of the potential uses of the memory effect such as in sound deadening, the degree of recovery exhibited in the memory effect process is not crucial to the application. However, in some applications sulfonated EPDM systems having high degrees of recovery will be needed. This example also illustrates that the memory characteristic can endure over long periods of time; in this case the distorted shape was maintained for over a month without appreciable change, but when reheated the sample still recovered appreciably towards its original shape.

EXAMPLE 5

The Memory Effect in a Foamed Sulfonated EPDM Composition

This sample was prepared from a free acid sulfonated EPDM similar to that described in Example 1, except that the sulfonation level was 1.3 mole percent. This free acid sulfonated EPDM was neutralized with an excess of magnesium stearate, having 2 equivalents of magnesium stearate for each equivalent of sulfonation. The resultant excess magnesium stearate and stearic acid acted as polar plasticizers for the neutralized sulfonated EPDM to enable easy fabrication and melt processing.

The neutralized sulfonated EPDM gum was compounded with 61 phr of Flexon 845 process oil on a two-roll mill, and then 1.5 wt. % of Opex 93 foaming agent was added to the formulation on a two-roll mill at a temperature well below the decomposition temperature of the blowing agent. This composition was then foamed by the compression molding foaming technique described in copending U.S. Ser. No. 855,727. The conditions for foaming were as follows: One hundred grams of the material was placed in a mold 5 inches square by one-quarter inch deep. The mold was placed in a press which was at a temperature of about 440° F. and pressure was applied. After 105 seconds the temperature of the press had been reduced to about 385° F. by the originally cool mold. The press was then opened rapidly and the material immediately foamed up. The foamed sample had small and relatively uniform cells, it had a density of 14 lbs. per cubic foot, and it was about one-half inch thick.

The memory characteristic of this foamed neutralized sulfonated EPDM compound was demonstrated by the following procedure. A sample approximately one-half inch in diameter was cut out of the foamed pad. It was compressed by about 60% of its original height in a clamping device and it was held at 100° C. for 45 minutes. It was then cooled to about 40° C. in the clamp, and then released from compression and allowed to cool to room temperature. When the height of the foamed sample was measured, it was found that the sample retained a substantial distortion (or compression) of 94% of the amount of compression. When remeasured an hour and a quarter later there had been little change in the compressed shape (only about 2%). The foamed sample was then placed in an oven at 130° C. After 30 minutes the sample was removed, and it was found to have recovered about half way towards the original height.

This example illustrates the memory effect for a foamed sulfonated EPDM material which was extended with oil, and it demonstrates the effectiveness of the memory behavior with foamed sulfonated EPDM articles.

The foamed article of this example differs from the bulk density articles of the previous examples in its manifestation of the memory characteristics in a few significant ways; and these differences can result in applications for the memory effect particularly suited to the foamed sulfonated EPDM. Perhaps the most important difference is that when the foam is compressed, it occupies a smaller volume; whereas, when the bulk density sample is compressed or distorted it spreads considerably in other directions so that there is no significant overall volume change. The decrease in volume for foamed sulfonated EPDM (especially for open celled foams of low density) when compressed during the memory effect procedure makes them very useful for void filling. The compressed foam can be placed in the void to loosely fill it, and then by heating in the manner described previously, the foam will recover towards its "remembered" original shape, thereby completely and firmly filling the void. This procedure has applications for sound deadening such as in a hollow wall in a vehicle, or for thermal or sound insulation in a building.

Another way the sulfonated elastomeric foams (especially low density foams), differ from the bulk material in their manifestation of the memory characteristic is in the force required to distort or compress the material. Low density sulfonated EPDM foams are useful for snugly, but gently packaging or storing delicate objects, wherein the object is first packaged loosely in the distorted or compressed elastomeric foam, and then the package is heated so that the foam expands to give the object gentle, but secure support on all sides to minimize shaking or movement of objects in the package during transit or handling.

EXAMPLE 6

The Memory Effect in a Foamed Sulfonated EPDM Composition Containing Oil and Filler The neutralized sulfonated EPDM gum described in Example 5, was compounded with 61 phr of Flexon 845 process oil and 1.5 wt. % of Opex 93 foaming agent as in Example 5. To this formulation was then added 41 phr of Allied whiting, and the formulation was blended on a 2-roll mill to form a homogeneous compound. This composition was foamed in a manner similar to the technique used in Example 5, except that the starting temperature of the press was about 465° F.; the sample remained in the press for about 1½ minutes; and the temperature when the press was opened was about 400° F. The resulting pad had an excellent, fine and uniform cell structure, and a density of 14 lbs. per cubic foot. The pad was about one-half inch thick.

A sample of this elastomeric sulfonated EPDM foam was tested for its memory effect. It was compressed by 59% of its original height and held in this configuration for 45 minutes at 100° C. The sample was then cooled to about 40° C., released from compression, and allowed to cool further to room temperature. When the height of the sample was measured, the foam was found to have retained 82% of the distortion. When remeasured 75 minutes later, there was only slight change in the height of the sample. To recover the distortion in this foamed elastomeric sulfonated EPDM sample it was placed in an oven at 130° C. for one-half hour, after which it was removed. The sample was found to have almost completely regained its original height, having only 6% residual distortion out of the previous 82%. The sample was heated for an additional 30 minutes in the 130° C. oven, after which its height was again measured. It was found that the distortion had increased to about 12%; so for this sample one hour at 130° C. was too long of a time for optimal recovery in the memory effect, and the increased heating time had actually resulted in a slight collapse in the sample.

This example indicates that the particular formulation of a foamed sulfonated EPDM composition can have a significant effect on the results when employing the memory effect on this sulfonated elastomeric material. In this example with the added mineral filler the memory characteristic enabled nearly complete recovery of the original shape, whereas in the previous example without the mineral filler the memory effect resulted in about 50% recovery towards the original shape. This example also showed that there is an optimal time for the recovery in the memory procedure since prolonged exposure to high temperatures can result in partial collapse of the elastomeric foam. It is expected that a number of variables will affect the particular results of the memory procedure with foams, including type of sulfonated elastomer (backbone type, cation) sulfonation level, plasticizer, compounding ingredients, and foam structure. In critical applications it may be necessary to carefully formulate and optimize the needed system; however, for many of the applications, such as void filling, the degree of recovery in the memory characteristic is relatively noncritical.

Since many modifications and variations of this invention may be made without departing from the spirit or scope of the invention thereof, it is not intended to limit the spirit or scope thereof to the specific examples thereof.

What is claimed is:

1. A process for reshaping a sulfonated elastomeric article from a sulfonated elastomeric blend composition, which includes a neutralized sulfonated elastomeric polymer having about 10 to about 50 meq. metal sulfonate groups/100 grams of said neutralized sulfonated elastomeric polymer and about 2 to about 40 parts by weight of a non-volatile preferential plasticizer per 100 parts by weight of said neutralized sulfonated elstomeric polymer, said process comprising the steps of:
   (a) applying sufficient pressure at room temperature to said sulfonated elastomeric article in its original shape so as to deform said sulfonated elastomeric article into a distorted or compressed shape;
   (b) heating said sulfonated elastomeric article in said distorted or compressed shape to a temperature of about 50° C. to about 160° C. under said pressure and maintaining said sulfonated elastomeric article in said distorted or compressed shape at about 50° C. to about 160° C. for at least about 1 minute;
   (c) cooling said heated sulfonated elastomeric article in such distorted or compressed shape from about 50° C. to about 160° C. to room temperature; and
   (d) removing said pressure at room temperature from said sulfonated elastomeric article in said distorted or compressed shape.

2. A process according to claim 1 further including the reshaping of said sulfonated elastomeric article of said distorted or compressed shape to such original shape which comprises the additional steps of:
   (a) heating said cooled sulfonated elastomeric article in said distorted or compressed state to a temperature of about 60° C. to about 180° C. for at least about 2 minutes thereby causing said sulfonated elastomeric article in said distorted or compressed state to recover towards said original shape of said sulfonated elastomeric article; and
   (b) cooling said sulfonated elastomeric article to room temperature.

3. A process according to claim 1, wherein said composition further includes a non-polar process oil having less than 2 wt. % polar type compounds and/or fillers and mixtures thereof, said filler being selected from the group consisting of calcium carbonate, talc and calcium carbonate.

4. A process according to claim 3, further including a chemical additive at a concentration level of about 0 to about 100 parts per hundred by weight based on 100 parts of said sulfonated elastomeric polymer, said chemical additive being selected from the group consisting of pigments, thermoplastics, and lubricants and mixtures thereof.

5. A process according to claim 1, wherein said nonvolatile polar plasticizer is selected from the group consisting of $C_{14}$ to $C_{26}$ long chain aliphatic acids, metallic salts of said long chain aliphatic acids, amides, ureas, amines and thioureas, and mixtures thereof.

6. A process according to claim 1, wherein said sulfonated elastomeric polymer is formed from an EPDM terpolymer or Butyl rubber.

7. The product prepared by the process of claim 1, wherein said product contains at least 8 parts by weight of a non-volatile preferential plasticizer per 100 parts by weight of said neutralized sulfonated elastomeric polymer, said neutralized sulfonated elastomeric polymer having about 10 to about 60 meq. of metal neutralized sulfonate groups per 100 grams of said neutralized sulfonated elastomeric polymer, said neutralized sulfonated elastomeric polymer being formed from an EPDM terpolymer having a Mooney viscosity (ML 1+8, 212° F.) of about 10 to about 50, said preferential plasticizer being selected from the group consisting of long chain aliphatic acids having about 12 to about 40 carbon atoms, metallic salts of said long chain aliphatic acids and amides and mixtures thereof.

8. A process according to claim 1, wherein said article is a bulk density article.

9. The product prepared by the process of claim 6, wherein said product contains at least 8 parts by weight of a non-volatile preferential plasticizer per 100 parts by weight of said neutralized sulfonated elastomeric polymer, said neutralized sulfonated elastomeric polymer having about 10 to about 60 meq. of metal neutralized sulfonate groups per 100 grams of said neutralized sulfonated elastomeric polymer, said neutralized sulfonated elastomeric polymer being formed from an EPDM terpolymer haing a Mooney viscosity (ML 1+8, 212° F.) of about 10 to about 50, said preferential plasticizer being selected from the group consisting of long chain aliphatic acids having about 12 to about 40 carbon atoms, metallic salts of said long chain aliphatic acids and amides and mixtures thereof.

10. A process according to claim 2, wherein said composition further includes an oil or fillers and mixtures thereof.

11. A process according to claim 10, further including a chemical additive at a concentration level of less than about 100 parts by weight based on 100 parts by weight of said sulfonated elastomeric polymer, said chemical additive being selected from the group consisting of pigments, thermoplastics, and lubricants and mixtures thereof.

12. A process according to claim 2, wherein said nonvolatile polar plasticizer is selected from the group consisting of $C_{14}$ to $C_{26}$ long chain aliphatic acids, metallic salts of said long chain aliphatic acids, amides, ureas, amines and thioureas, and mixtures thereof.

13. A process according to claim 2, wherein said sulfonated elastomeric polymer is formed from an EPDM terpolymer or Butyl rubber.

14. A process according to claim 2, wherein said article is a foamed article.

15. A process according to claim 2, wherein said article is a bulk density article.

16. A process according to claim 1, further including the additional step of storing at about ambient temperature said distorted article prior to heating said distorted article to said second elevated temperture.

* * * * *